United States Patent
Kennedy et al.

(10) Patent No.: US 7,382,765 B2
(45) Date of Patent: Jun. 3, 2008

(54) PREDICTIVE ROUTING IN A MOBLE AD HOC NETWORK

(75) Inventors: Robert A. Kennedy, Melbourne, FL (US); Joseph Bibb Cain, Indialantic, FL (US)

(73) Assignee: Harris Corporation, Melbourne, FL (US)

(*) Notice: Subject to any disclaimer, the term of this patent is extended or adjusted under 35 U.S.C. 154(b) by 973 days.

(21) Appl. No.: 10/426,281

(22) Filed: Apr. 30, 2003

(65) Prior Publication Data

US 2004/0218548 A1 Nov. 4, 2004

(51) Int. Cl.
*H04L 12/50* (2006.01)

(52) U.S. Cl. .................. 370/351; 370/400; 370/401

(58) Field of Classification Search ........... 370/230, 370/235, 238, 251, 252, 254, 328, 338, 351, 370/352, 255, 400; 455/1
See application file for complete search history.

(56) References Cited

U.S. PATENT DOCUMENTS

| | | | | |
|---|---|---|---|---|
| 5,905,712 | A * | 5/1999 | Cresswell et al. | 370/238 |
| 6,069,895 | A | 5/2000 | Ayandeh | 370/399 |
| 6,115,580 | A * | 9/2000 | Chuprun et al. | 455/1 |
| 6,400,690 | B1 * | 6/2002 | Liu et al. | 370/252 |
| 6,704,301 | B2 * | 3/2004 | Chari et al. | 370/351 |
| 6,791,949 | B1 * | 9/2004 | Ryu et al. | 370/254 |
| 6,940,832 | B2 * | 9/2005 | Saadawi et al. | 370/328 |
| 7,200,149 | B1 * | 4/2007 | Hasty, Jr. | 370/400 |
| 2002/0186665 | A1 * | 12/2002 | Chaffee et al. | 370/255 |
| 2003/0179742 | A1 * | 9/2003 | Ogier et al. | 370/351 |
| 2004/0085909 | A1 * | 5/2004 | Soliman | 370/252 |

FOREIGN PATENT DOCUMENTS

| | | |
|---|---|---|
| EP | 0 386 607 | 9/1990 |
| WO | 02/078229 | 10/2002 |
| WO | 02/087176 | 10/2002 |

OTHER PUBLICATIONS

Article, "Path Set Selection in Mobile Ad Hoc Networks", MOBIHOC '02, Jun. 9-11, 2002, EPFL Lausanne, Switzerland. Copyright 2002 ACM 1-58113-501-7/02/0006.
Aritcle, "Metrics to Enable Adaptive Protocols for Mobile Ad Hoc Networks", Colorado School of Mines, Dept. of Math and Computer Sciences.

(Continued)

*Primary Examiner*—Chau T. Nguyen
*Assistant Examiner*—Eunsook Choi
(74) *Attorney, Agent, or Firm*—Allen Dyer Doppelt Milbrath & Gilchrist

(57) ABSTRACT

The mobile ad hoc network includes a plurality of wireless mobile nodes and a plurality of wireless communication links connecting the nodes together. A method for managing and controlling the discovery and maintenance of routes in the network includes predicting future-needed routes or the need for future communications in the network, and predicting future-network dynamics or topology. Partial and complete routes are discovered along predicted future-needed routes based upon the predicted need for routes and the predicted network dynamics or topology. Route tables are built and updated at each mobile node with a route discovery process to store the partial and complete routes in the network.

31 Claims, 5 Drawing Sheets

OTHER PUBLICATIONS

Article, "Longevity of Routes in Mobile Ad Hoc Networks", Center for Research in Wireless Mobility and Networking(CreWMaN), The University of Texas at Arlington, Department of Computer Science.

Article, "Predictive Location-Based QoS Routing in Mobile Ad Hoc Networks", University of Illinois at Urbana-Champaign, Department of Computer Science.

Article, "Preemptive Routing in Ad Hoc Networks", 2001 ACM ISBN 1-58113-422-Mar. 1, 2007.

* cited by examiner

PREDICTIVE ROUTING IN A MOBLE AD HOC NETWORK

FIELD OF THE INVENTION

The present invention relates to the field of communication networks, and, more particularly, to mobile ad hoc wireless networks and related methods.

BACKGROUND OF THE INVENTION

Wireless networks have experienced increased development in the past decade. One of the most rapidly developing areas is mobile ad hoc networks. Physically, a mobile ad hoc network includes a number of geographically-distributed, potentially mobile nodes wirelessly connected by one or more radio frequency channels. Compared with other type of networks, such as cellular networks or satellite networks, the most distinctive feature of mobile ad hoc networks is the lack of any fixed infrastructure. The network is formed of mobile nodes only, and a network is created on the fly as the nodes transmit to or receive from other nodes. The network does not in general depend on a particular node and dynamically adjusts as some nodes join or others leave the network.

In a hostile environment where a fixed communication infrastructure is unreliable or unavailable, such as in a battle field or in a natural disaster area struck by earthquake or hurricane, an ad hoc network can be quickly deployed and provide much needed communications. While the military is still a major driving force behind the development of these networks, ad hoc networks are quickly finding new applications in civilian or commercial areas. Ad hoc networks will allow people to exchange data in the field or in a class room without using any network structure except the one they create by simply turning on their computers or PDAs.

As wireless communication increasingly permeates everyday life, new applications for mobile ad hoc networks will continue to emerge and become an important part of the communication structure. Mobile ad hoc networks pose serious challenges to the designers. Due to the lack of a fixed infrastructure, nodes must self-organize and reconfigure as they move, join or leave the network. All nodes could potentially be functionally identical and there may not be any natural hierarchy or central controller in the network. Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

A routing protocol needs to adapt to frequent topology changes and with less accurate information. Because of these unique requirements, routing in these networks is very different from others. Gathering fresh information about the entire network is often costly and impractical. Many routing protocols are reactive (on-demand) protocols: they collect routing information only when necessary and to destinations they need routes to, and do not generally maintain unused routes after some period of time. This way the routing overhead is greatly reduced compared to pro-active protocols which maintain routes to all destinations at all times. It is important for a protocol to be adaptive. Ad Hoc on Demand Distance Vector (AODV), Dynamic Source Routing (DSR) and Temporally Ordered Routing Algorithm (TORA) are representative of on-demand routing protocols presented at the MANET working group.

Examples of other various routing protocols include Destination-Sequenced Distance Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both proactive and reactive approaches based upon distance from a source node.

These conventional routing protocols use a best effort approach in selecting a route from the source node to the destination node. Typically, the number of hops is the main criteria (metric) in such a best effort approach. In other words, the route with the least amount of hops is selected as the transmission route.

An application that a network is connected to may be time-critical and cannot withstand the delays imposed by an on-demand route discovery approach. The network may have too many nodes or is too power-constrained to do frequent-enough updates of the network topology by a source node. This rules out a proactive MANET routing approach. Therefore, the designer would typically choose a reactive (on-demand) routing protocol because that is the only other conventional routing protocol available. But, because there are severe restrictions on the time constraints allowed to discover a route, the on-demand discovered routes may be too late to be useful.

SUMMARY OF THE INVENTION

In view of the foregoing background, it is therefore an object of the present invention to provide predictive discovery of routes in a mobile ad hoc network.

This and other objects, features, and advantages in accordance with the present invention are provided by a network and method for managing and controlling the discovery of routes in the mobile ad hoc network. The mobile ad hoc network includes a plurality of wireless mobile nodes and a plurality of wireless communication links connecting the nodes together. The method includes predicting future-needed routes in the network, and predicting future-stability of links and nodes along predicted future-needed routes. Partial and complete routes are discovered along predicted future-needed routes based upon the predicted future-stability of the links and nodes. Route tables are built and updated at each mobile node with a route discovery process to store the partial and complete routes in the network.

DETAILED DESCRIPTION OF THE PREFERRED EMBODIMENTS

Figure 1:
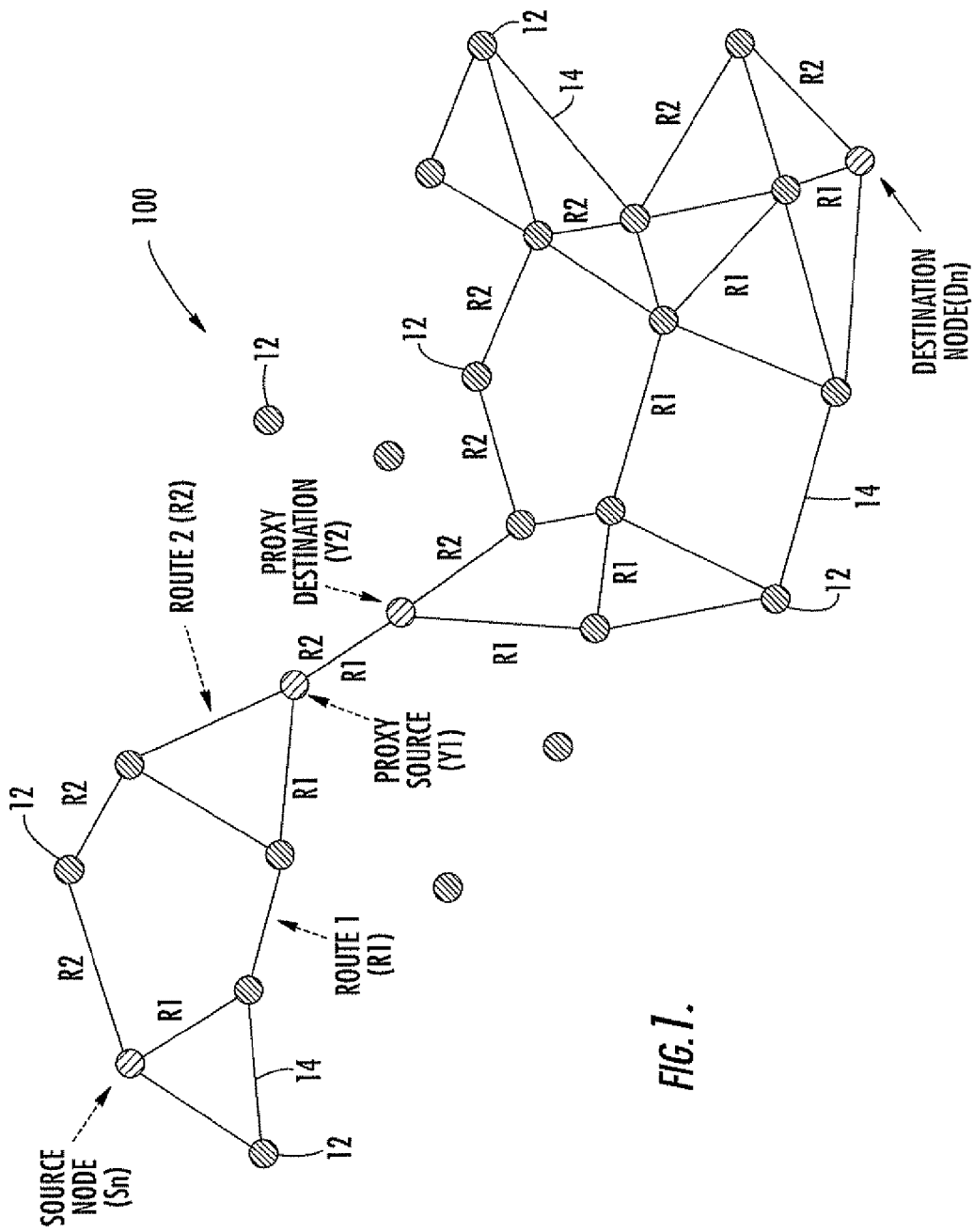
FIG. 1 is a schematic diagram of a mobile ad hoc network in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer or other programmable apparatus implemented process such that the instructions which execute on the computer or other programmable apparatus provide steps for implementing the functions specified in the flowchart block or blocks.

The present invention may make use of the temporal transition network protocol (TTNP) in a mobile ad hoc network to efficiently make use of the management and control of route discovery and associated processes via temporal transitioning processes and events in a mobile ad hoc network, as described in copending application Ser. No. 10/134,856, filed Apr. 29, 2002 by the same assignee of record and incorporated by reference herein in its entirety. Furthermore, the present invention may make use of "Intelligent Communication Node Object Beacon Framework" (ICBF), for intelligent, adaptive advertisement by any communications node object of its presence and/or the corresponding detection (neighbor discovery) by another node object or the network of those node objects transmitting such beacons as described in copending application Ser. No. 10/235,242, filed Sep. 4, 2002 by the same assignee of record and incorporated by reference herein in its entirety.

Predictive or Psiactive routing ($\Psi Rt$) is route discovery and maintenance in which the network "senses and predicts" a need will occur in the future to have additional routes established or maintained which may not presently be needed. Fundamentally, $\Psi Rt$ fuses key information from multiple network layers as is necessary to accomplish reliable prediction of future needed routes and the accompanying route maintenance operations. The following discussion will generally cover, for each component of Psiactive Routing ($\Psi Rt$), the architecture of the $\Psi Rt$ component, a terse algorithm where appropriate for each major capability/ functionality of the component, external interfaces to other $\Psi Rt$ components and larger network architectures such as hybrid ad hoc networks, network state profiles used by the $\Psi Rt$ component and $\Psi Rt$ dedicated and nondedicated protocols used by the component.

$\Psi Rt$ is a class of ad hoc network routing which fuses either a proactive or reactive (on-demand) method for handling current routing scenarios with a major predictive capability that fundamentally uses a forecasting technique to peer into some future state of the network (or part of the network) to greatly increase the ability of the ad hoc network routing to timely respond to the entire range of network dynamics from slow to very rapid. Within the $\Psi Rt$ context, a "forecast" is any intermediate lookahead step and the "prediction" is the result of all steps leading up to the final (predicted) outcome. $\Psi Rt$ will operate correctly with any general network architecture such as hierarchical or flat. $\Psi Rt$ will also correctly operate by itself or as part of a hybrid routing scheme such as Temporal Transition Network Protocol (TTNP) or Zone Routing Protocol (ZRP). $\Psi Rt$ is adaptable to the environment that it is inserted into.

Contrary to the current state of thinking in ad hoc network routing, proactive and reactive methods are not capable of adequately addressing a broad class of network routing (including route discovery, route maintenance, route failure and topology discovery) problems which are a dominant type of problem in many important applications. Both proactive and reactive methods are only capable of addressing current routing scenarios and even then, they are only capable of handling light to moderate network topology dynamics. Such rates are relative to the number of nodes in the network, the bandwidth of the communications links, the number of source-destination pairs, and the quality of the links.

FIG. 1 is a snapshot of an example network 100 of mobile nodes 12 showing the wireless links 14 connecting nodes. The application that this network is connected to is time-critical and cannot withstand the delays imposed by an on-demand route discovery approach. This network has too many nodes or is too power-constrained to do frequent-enough updates of the network topology by the source node $S_n$. This rules out a proactive MANET routing approach. Therefore, the designer would typically choose a reactive (on-demand) routing method because that is the only other conventional fundamental class of routing methods available.

At some point in time, a request is made for $S_n$ to send information to the destination node $D_n$. The route is not in the route cache of $S_n$ and therefore the reactive route discovery process is activated and discovers Route 1 (R1) and Route 2 (R2). Because there are severe restrictions on the time constraints allowed to discover a route, the discovered Routes 1 and 2 are too late to be useful. This routing problem is solved by the availability of psiactive routing ΨRt that has the ability to form some routes or route segments, e.g. nodes Y1 and Y2 and the link between them, before the routes are even needed. The general attributes of this new routing method include using application information to predict when and to where routes will be needed, using link/node/path predicted dynamics to improve route construction and robustness, providing for the preconstuction of some routes and partial routes (route segments) that are likely to be stable at the time needed, to be placed into $S_n$'s route table (cache) before these routes are actually needed, improving the real-time response capability (i.e. a super real-time response) with potentially less overhead, and using ΨRt combined with many existing routing algorithms. The basic technology approach then breaks into three distinct, but interconnected parts: predicting routes that will be stable at the point in time required by the application; activating those routes when appropriate; and maintaining those routes until and after they are needed for some period of time.

Figure 2:
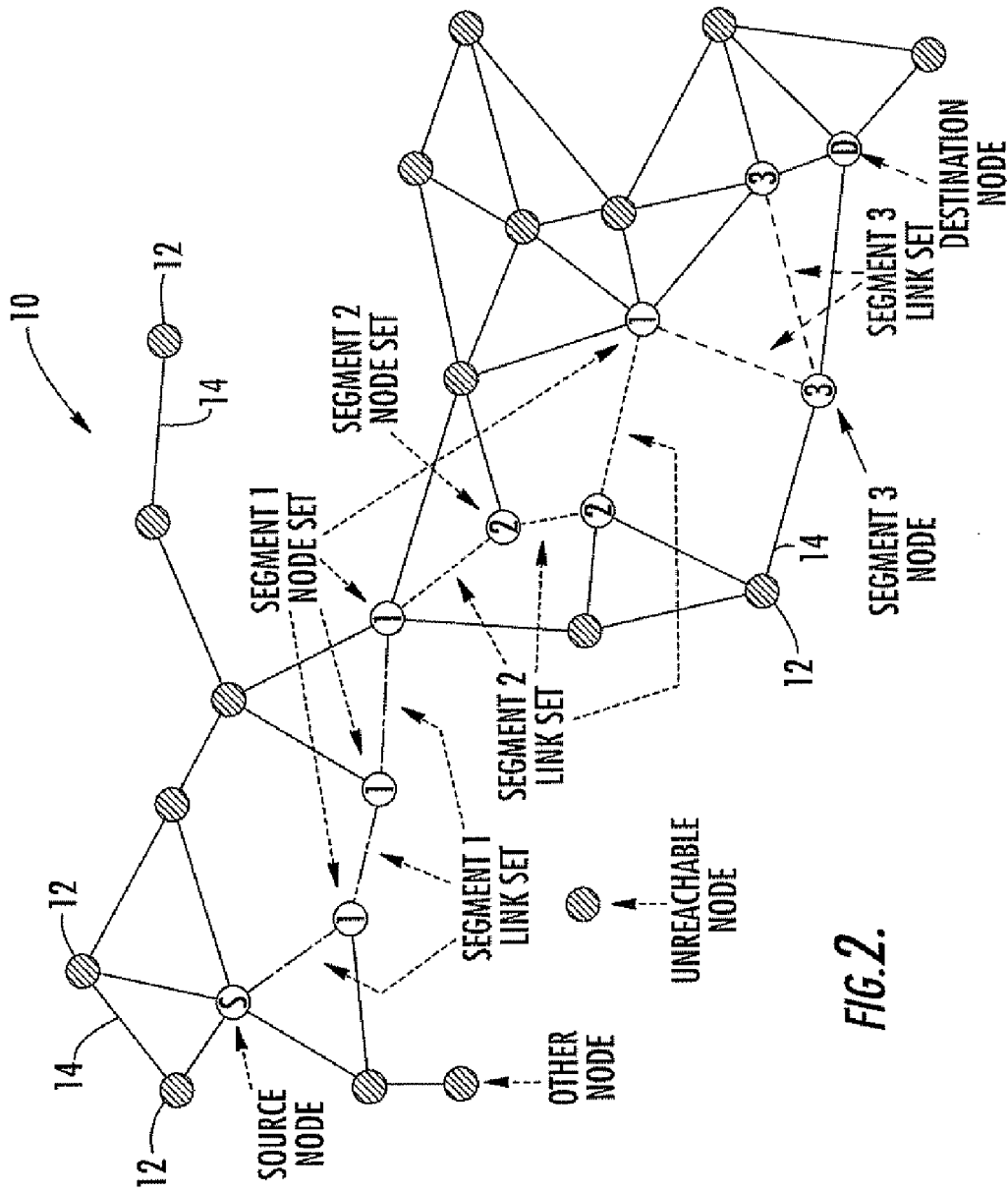
FIG. 2 is a schematic diagram ilustrating the operation of a mobile ad hoc network in accordance with the present invention.
Figure 3:
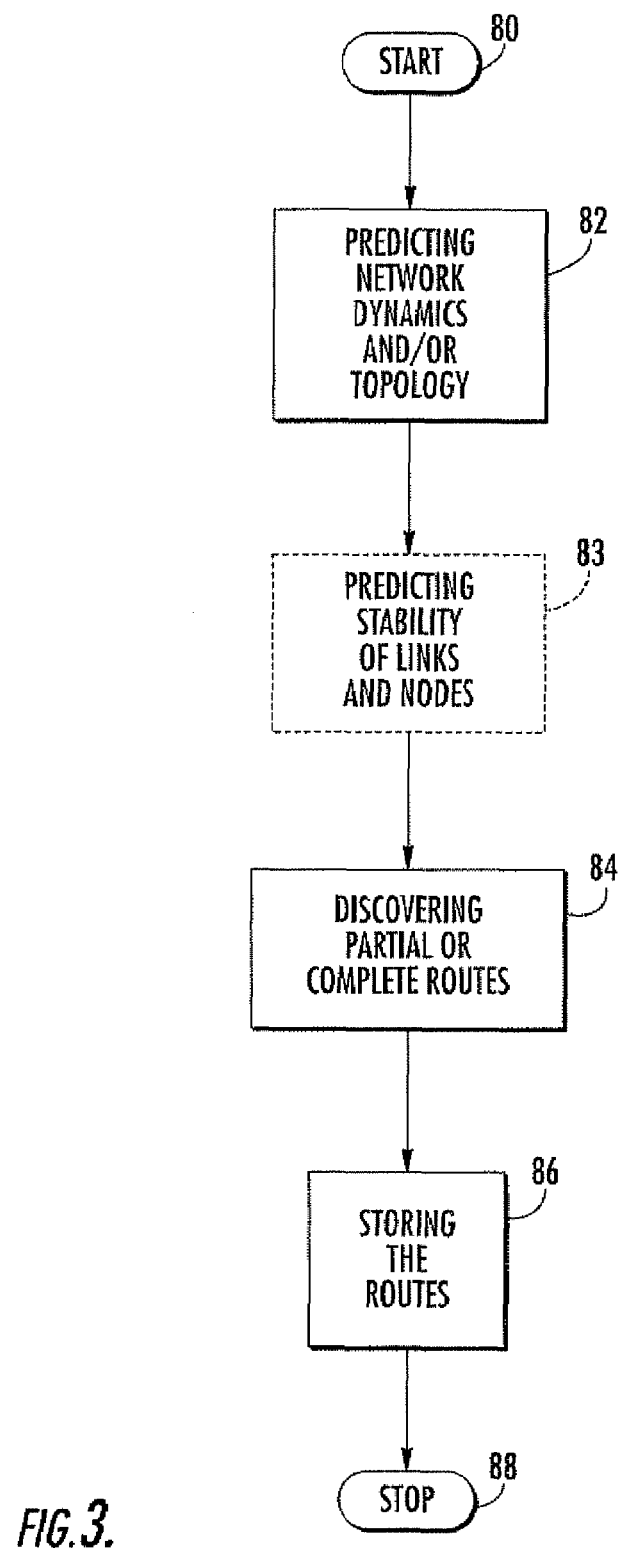
FIG. 3 is a flowchart illustrating the steps of a method for managing and controlling the discovery and maintenance of routes in accordance with the present invention.

Referring now to FIGS. 2 and 3, a method for operating a mobile ad hoc network 10, e.g. by discovering routes from a source node to a destination node, will now be described. The network 10 includes a plurality of mobile nodes 12 including the source node S and the destination node D with intermediate nodes therebetween. The nodes 12, such as laptop computers, personal digital assistants (PDAs) or mobile phones, are connected by wireless communication links 14 as would be appreciated by the skilled artisan.

The method begins (FIG. 3; block 80) and includes predicting future-needed routes in the network 10, a route comprising a set of wireless communication links 14 and mobile nodes 12 from a source S to a destination D. Predicting future need routes preferably includes predicting a need for future communications between at least two of the plurality of mobile nodes and may be based upon fuzzy logic. Such a need is typically based upon current and historical traffic data, for example. Future-network dynamics and/or topology are predicted (block 82), and routes, including partial routes or complete routes, are discovered (block 84) along predicted future-needed routes in the network based upon the predicted future-network dynamics and/or topology. Also, the method includes (block 86) storing the routes, e.g. in a route cache or table, for future use, before ending at block 88. The method may also include predicting future stability of links 14 and nodes 12 along predicted future-needed routes including each node predicting and transmitting link and node stability information to other nodes (block 83).

In the method, predicting future-network dynamics may include monitoring current-network dynamics, and discovering routes may include discovering routes from a proxy-source node to a proxy-destination node. The proxy-source node and proxy-destination node are preferably chosen based upon predicted future stability of links 14 and nodes 12 along predicted future-needed routes. Typically, the source node S transmits a request to the proxy-source node to establish a partial route from the proxy-source node to the proxy-destination node.

Link and node stability information may be transmitted to other nodes 12 via replies to route requests, and future-needed routes may be predicted based upon at least one of mission plans, schedules, planned traffic patterns and network management data. Furthermore, predicting future-network dynamics (block 82) preferably includes predicting future route failure and/or predicting future route maintenance, as will be described in greater detail below.

More specifically, predicting route failure may include generating route failure metrics including link failure metrics and node failure metrics for each route which may include estimating node mobility and/or radio frequency (RF) propagation characteristics. Route failure metrics may be broadcast to other nodes in the network. Predicting route failure may also include determining a mean time to failure (MTF) for a route from a source to a destination based upon the route failure metrics.

Performing predictive route maintenance may include discovering alternative routes, e.g. by predicting the future viability of alternate routes to replace routes predicted to fail, increasing transmission power on a link to reduce route failure, allocating additional channels on a link to reduce route failure, and/or determining whether alternate routes are stored in the route tables/cache to replace routes predicted to fail.

ΨRt has many different network parameters that it can predict given proper sampling and timely processing of the target data. One such category of parameters predictions is the node and link dynamics, for example. There is a tradeoff between longer routes through more stable links and nodes versus shorter routes that may use some less stable links and nodes. This is analogous to a pilot safely flying the long way around a severe thunderstorm and arriving at the destination instead of taking the short way through the middle of the thunderstorm and risking not getting to the destination at all.

Predicted node and link dynamics can be used with reactive, proactive, hybrid, hierarchical, and structured flat routing approaches. If used in a structured network such as Hierarchical Reactive Routing (HRR), predicted node and link dynamics can optimize cluster formation. As discussed above with reference to FIGS. 1 and 2, ΨRt can predict partial routes (route segments) where portions of a route may be unstable, and therefore need frequent rerouting through or avoiding altogether, while other route segments in the route are predicted to be stable enough to be utilized at the future needed time.

These predictions also can be used to optimize required updates of routing information for ad hoc routing protocols, for example, in proactive protocols such as Optimal Link State Routing (OLSR), to adaptively control the period of routing information broadcasts for each node based on predicted link and node dynamics at that node. This can lead to significant savings of overhead information in the overall network and therefore freeing more of the overall network bandwidth for non-overhead information. In a similar fashion, hybrids (e.g. TTNP) and hierarchical (e.g. HRR) can be so equipped to optimize routing information broadcasts. Predicted link and node dynamics can also be used in multiple path routing. For multiple path routing, these predictions could determine the number of paths required, selection of backup routes to provide more robust delivery, and the coding overhead for network time coding.

Specifically, these traffic predictions include traffic loads, sources and sinks. For example, mission plans could indicate when certain nodes need to exchange information. If a reactive protocol such as AODV is used by ΨRt, AODV would be stimulated to do route discovery before the route is actually needed. This enables AODV to behave more like a proactive routing method. If a proactive protocol like OLSR is used by ΨRt, the topology update period of the network, or some subset of it, could be adjusted according to the predicted routing needs of the network. The general capability to adjust the full/subset network topology update period using ΨRt's predictive capabilities is further discussed below.

Various general entities that comprise a ΨRt network will now be defined. These are illustrated in FIGS. 1 and 3. A link 14 is the most atomic connection in a ΨRt network and is simply the physical link between any two nodes 12. A node 12 is the end point of a link 14. Information describing the node includes an ID (IP address, ATM address, etc) and positional information if available. A route segment RS is a set of links and nodes grouped together to form a reusable entity in potentially more than one route. Nothing in the definition requires these links to be spatially contiguous or the nodes to be adjacent to (within 1 hop of) at least one other node in the RS. For example, in FIG. 1, Segment 1's links are contiguous, but Segment 1's nodes are not all within 1 hop of at least one other node in RS 1. A segment link set (SLS) is an RS minus its nodes. A segment node set (SNS) is an RS minus its links. A route is a set of route segments whose union forms a contiguous path from the source S to the destination D. A route link set (RLS) is a route minus its nodes. A route node set (RNS) is a route minus its links. A proxy source node ($pS_n$) is an intermediate node in a route that is the beginning node of a RS in that route. This definition rules out the actual source node $S_n$ from ever being a $pS_n$ and vice versa. A $pS_n$ is so named because it functions as a substitute $S_n$ under certain circumstances. A proxy destination node ($pD_n$) is an intermediate node in a route that is the terminating node of a RS in that route. This definition rules out the actual destination node $D_n$ from ever being a $pD_n$ and vice versa. A $pD_n$ is so named because it functions as a substitute $D_n$ under certain circumstances. A source destination subset (SDS) is the allowed subset of possible destination nodes for the designated source node. The limiting case is the entire network. A notable special case is a formal subnet.

When a route segment RS is created, a route segment profile also gets created which contains the following information. A segment link set profile (SLSP) which is the ordered SLS for this segment. This ordering may change over time as well as the ordering parameter(s). A segment node set profile (SNSP) which is the ordered SNS for this segment. This ordering may change over time as well as the ordering parameter(s). A time dependent segment stability profile (TSSP) which can be any type of descriptor such as a mathematical function (deterministic, statistical, fuzzy), set of heuristic rules, etc. combined with accumulated node and link status/state information that together track and forecast the way in which a route segment changes over time. For example, one of the simplest descriptors is a linear function characterized by the link quality and node dynamics for that route segment. Each link and node associated with this descriptor would have the same stability profile function, but with different slopes which represent different rates of deterioration and restoration. Link and node availability data would be collected at various times for the links and nodes in this segment and processed by the descriptor. This is a very effective conceptual mechanism for representing RSs with any type of stability from highly unstable to essentially permanently stable segments.

When a route is created, a route profile also gets created which contains the following information. A route segment set profile (RSSP) which contains the ordered set of route segments (RS) that make up the set of links in this route segment. This ordering may change over time as well as the ordering parameter(s). A time dependent route stability profile (TRSP) which can be any type of descriptor such as a mathematical function (deterministic, statistical, fuzzy), set of heuristic rules, etc. that track and forecast the way in which a route changes over time with respect to which route segments connect/disconnect to this route. For example, one of the simplest descriptors is a linear function characterized by the link quality and node dynamics for that route segment. Each segment associated with this descriptor would have the same stability profile function, but with different slopes which represent different rates of deterioration and restoration. Segment availability data and intersegment interaction data would be collected at various times for the segments in this route and processed by the descriptor. The TRSP is a very effective conceptual mechanism for representing the stability of a route with respect to entire route segments. The TRSP indicates a higher order of stability in the network than what the examination of individual links and nodes would show.

Figure 4:
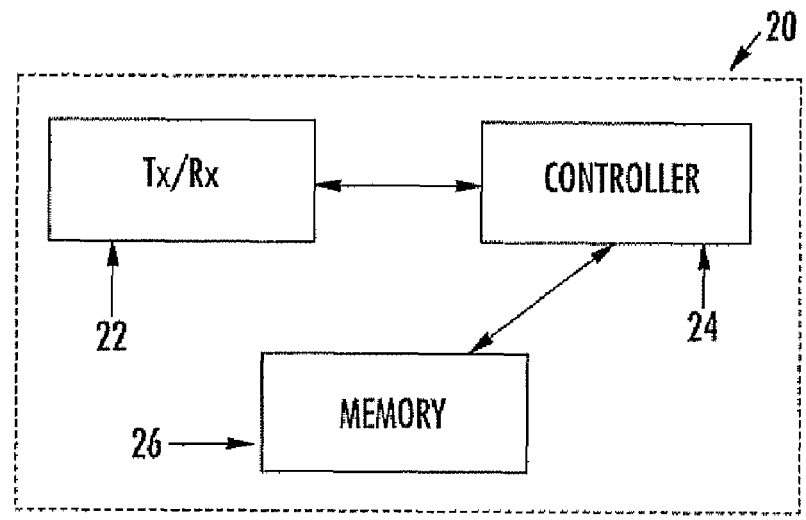
FIG. 4 is a schematic diagram illustrating a router of a node in accordance with the network of the present invention.
Figure 5:
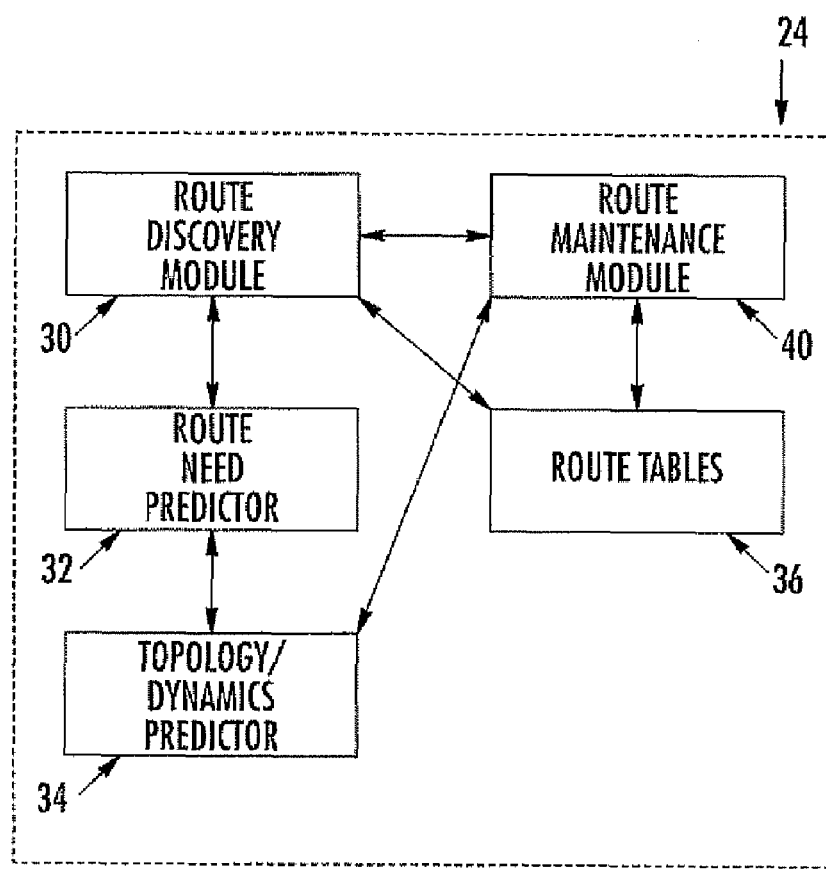
FIG. 5 is a schematic diagram illustrating the details of the controller of the router in FIG. 3.

A system aspect of the invention will now be described with further reference to FIGS. 4 and 5. As discussed, the mobile ad hoc network 10 has a plurality of wireless mobile nodes 12, and a plurality of wireless communication links 14 connecting the nodes together. Each mobile node 12 includes a router 20 that has a communications device 22 to wirelessly communicate with other nodes of the plurality of nodes via the wireless communication links 14. Also, the router includes a controller 24 to route communications via the communications device 22. Also, a memory 26 may be included as part of the controller 24 or in connection with the controller.

The controller 24 includes route tables 36 to define partial and complete routes in the network 10. Again, a route is a set of links 14 and nodes 12 from a source to a destination. The controller also includes a route-need predictor 32 to predict a need for future communications between at least two of the plurality of mobile nodes, and a topology and/or dynamics predictor 34 to predict future-network topology and/or dynamics. The controller 24 also includes a route discovery module 30 to discover routes, including partial and/or complete routes, based upon the need for future communications and the predicted future-network topology. The route discovery module updates the route tables 36 via a route discovery process.

The route-need predictor 32 may predict the need for future communications based upon fuzzy logic "if-then" rules and statistical numerical forecasts as will be described in greater detail below. As will be discussed, the route-need predictor 32 may store descriptive information of the network including at least one of physical and operational characteristics of the network which is samples and updated. Here, the route-need predictor 32 would preferably include a knowledge base of fuzzy if-then rules.

The topology and/or dynamics predictor 34 preferably includes a route failure predictor to predict failure of routes defined in the route tables/cache 36. The route failure predictor generates route failure metrics including link failure metrics and node failure metrics, and may estimate node mobility and/or RF propagation characteristics to generate the route failure metrics. The route failure predictor also determines a mean time to failure (MTF) for a route from a source to a destination based upon the route failure metrics, as will be described in greater detail below.

A route maintenance module 40 performs route maintenance in the network based upon predicted route failure. For example, the route maintenance may direct the route discovery module 30 to discover alternative routes to replace routes predicted to fail. Alternatively or in combination, the route maintenance module 40 may increase transmission power on a link to reduce route failure, allocate additional channels on a link to reduce route failure, and/or determine whether alternate routes are defined in the route tables/cache 36 to replace routes predicted to fail.

The general architecture of ΨRt (ΨAr) is built upon the premise of identifying and defining the components of ΨRt such that these components and their external ΨRt parameters are not dependent upon any particular application or general protocol stack. This defined generic set of external ΨRt interface parameters require whatever protocol stack and application is chosen by the applications systems design to conform to the ΨRt interface specification. Such conformation could required the specific applications system to create these parameters through a custom parameter conversion or extraction process. The architecture of each major component is kept separate from ΨAr so as to further preserve this independence.

Figure 6:
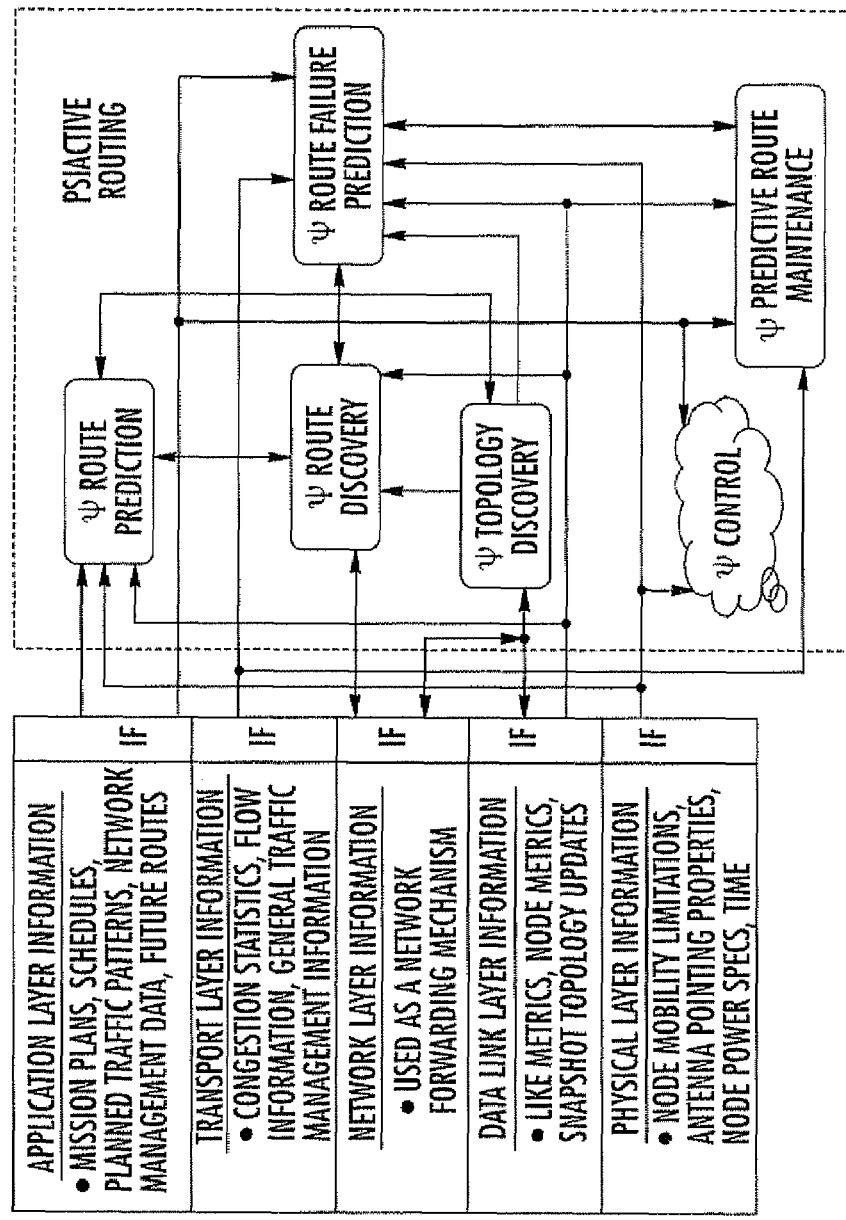
FIG. 6 is a schematic diagram illustrating the general architecture of psiactive routing.

FIG. 6 shows the general architecture of ΨRt (ΨAr) including the interfaces (IF) between the six major functional components that form ΨRt and an example protocol stack on the left. Other protocol stacks may be architected differently, but the set of interfaces (IF) must still provide ΨRt with the information in the parametric forms discussed below. IFs are in general customized for the particular stack and application although a set of generic IFs should be available as templates or defaults for each broad type of protocol stack.

As seen from FIG. 6, the six major components are ΨControl (ΨCn), ΨRoute Prediction (ΨRp), ΨRoute Discovery (ΨRd), ΨTopology Discovery (ΨTd), ΨRoute Failure Prediction (ΨRf), and ΨPredictive Route Maintenance (ΨRm). For drawing clarity, ΨCn is not shown as explicitly connected to any one of the other components even though there actually are two-way connections/arrows between ΨCn and all the other major components of a ΨRt.

ΨCn is the overall controller or manager for ΨRt. ΨRp predicts future new routes and route segments. ΨRf predicts the failure of routes. ΨRm predicts what should be a fix for a predicted future route failure so that when the route failure actually occurs, assuming it does, the time to discover such a fix is reduced or altogether eliminated. ΨRd is the route discovery function that ΨRp and ΨRm uses to discover new routes/route segments. ΨTd is the topology discovery function for ΨRt.

ΨRt does not explicitly address how any of these six components are physically mapped to any given node or subset of nodes. It is the philosophy of ΨRt to leave the physical mappings to the targeted application or to the designer of the network that must support one or more applications. However, one could argue that it is preferable to have all of these components on each node provided the physical resources of the node will support all of these components residing simultaneously on each node and provided there are no other concerns, such as security, about having so much functionality on each node. The requirements, strategies, reasoning and candidate network architectures for how fully distributed functionality should be in a network should be determined by the network designer.

Conceptually, ΨRt is independent of such mappings. However, for reasons such as throughput, security and energy-constrained nodes, some distributed architectures would naturally be preferable to others depending on the circumstances.

As seen in FIG. 6, there is direct interaction of the five layers of network communications on the left and the five non-control components of ΨRt although the interaction is not a one layer to one component mapping. ΨCn provides the controls for directing the other five components in a coherent, symphonic operation and its external interfaces are discussed separately in the ΨCn section. Details of each of these components follows.

Application layer-derived data is distributed to ΨRp, ΨRm and ΨRf. This data includes information such as mission plans, schedules, planned traffic patterns, network management data and explicitly-specified future routes. Physical layer information is distributed to ΨRp and ΨRf. Physical layer-derived data includes node mobility limitations, node power specifications and antenna pointing properties. Datalink layer-derived information such as link metrics, node metrics and snapshot topology updates is distributed to ΨRp, ΨRd, ΨRm, ΨRf and ΨTd. However, not all this datalink layer information is sent to each ΨRt component. Transport layer-derived information such as congestion statistics, flow information, and general traffic management information is distributed to ΨRf and ΨRm.

The network layer serves as the mechanism for forwarding information to ΨRd and ΨTd. ΨRt does not explicitly extract this information from these layers, but depends on a separate interface typically written by the application to extract these parameters. The default for ΨRt is to use its set of generic network stack interfaces as the templates for any particular application to utilize ΨRt. One of the distinctive hallmarks of ΨRt is its ability to utilize information from many of the classical layered structure for network communications and yet still function in a less optimal mode should some of this information not be available to ΨRt. Applications, such as mission planning would still function without the network, but the network would use mission planning information if available for improving route prediction.

An example execution flow of a ΨRt network including a large number of mobile nodes is presented below. This example network is using AODV (ΨRt/AODV) as the conventional routing component of ΨRt. AODV (Ad hoc On-demand Distance Vector) is a reactive routing method. A different reactive method, such as Dynamic Source Routing, could be appropriately substituted for AODV as be required by the system. A similar set of steps be developed for a ΨRt/OLSR (Optimal Link State Routing) or using some other proactive method.

1. ΨCn is activated by the system at network initialization and assumes control of the activation of ΨRt including the conventional routing component (AODV) of ΨRd.
2. Ad hoc network routing is initialized using AODV.
3. Route caches (tables) get built for various nodes as route requests are generated.
4. At some point in time, ΨCn activates ΨRp which in turn takes control from AODV when one or more of the following conditions are met.
    Designated sets of network stability conditions 1) reach a certain level or 2) track to a specified pattern of change in an area of interest (AOI) in the network.
    Some nodes in one or more designated areas of the network start moving too rapidly to be reliably considered a part of route under current discovery.

Nodes move from one part of the network to an area of uncertain, not necessarily unstable, conditions that could affect the ability to use AODV with some minimal predictable level of reliabilty.

ΨCn receives instructions from an application that communications will be needed among some set of network nodes at some point in the future, but not needed at this time.

The network response to the engagement of ΨRt is as follows.

5 ΨCn multicasts a message to the relevant nodes in the affected areas.

6 Message is specifically directed toward the ΨRp, ΨRm or ΨRf components. ΨRd and ΨTd are slaves to the other components of ΨRt.

7 Message is to predict one or more routes for the designated AOI, predict failures in the AOI or to predict the route maintenance solution to a failure before the failure occurs.

8 Message goes out to the entire network or to designated subsets of it.

9 From this point on until the network is shut down, route tables (caches) are modified by both the predictive components of ΨRt and by the more conventional, non-predictive component of of ΨRt (in this case, AODV).

10 Through the execution of ΨRt, collected data is recorded in the associated TRSPs and TSSPs.

11 Create and update the information bases of the associated TRSPs and TSSPs to track the stability and state of each of the network components (nodes, links, segments, and routes).

12 Not all the collected data in these information bases need come from just a route cache analysis.

This and other related data can also be collected from separate QoS and traffic management information bases if those services have collected such data. This data can also come directly from nodes transmitting link and node status.

As mentioned above, ΨRt does not fundamentally dictate the mapping of control to a single or any particular group of nodes in the network. Therefore, ΨCn could be distributed to every node in the network or be restricted to one or a few selected nodes depending on the designer's requirements and preferences. The other components of ΨRt are not restricted to residing on the same node with ΨCn. As in all cases with a network in which ΨRt is present, ΨCn actually activates the other components of ΨRt according to external information supplied to ΨCn. One tactic is to activate ΨRt on a periodic basis with the period determined by network conditions. Conditions that could cause a periodic activation of ΨRt are expected changes in node deployment patterns at certain times, regular rapid additions/deletions of nodes in the network and predictable changes in directional antenna pointing effectively turning on and off links between nodes for some period of time. Another tactic is to activate ΨRt according to the outputs of a mission plan which are interpreted by the ΨRp module. In a hybrid network, the availability of ΨRt and not necessarily its activation, could be controlled by the switching logic of the hybrid. For example, a network using the Temporal Transition Network Protocol (TTNP) uses various stability conditions to determine when and where to switch from using a proactive routing protocol to using a reactive routing protocol and vice versa. The general version of TTNP is not limited to just proactive and reactive protocols. TTNP could also include ΨRt as part of the hybrid. Therefore, activation of ΨRt in a TTNP network would be controlled by some specified set of network stability conditions.

On the other hand, ΨRt, specifically ΨCn, will not always be activated in a hybrid ad hoc network and therefore would be unavailable to exert any control during the unavailability period. When active, ΨRt will need to know what happened in the network during its "blackout" period. It will be the responsibility of the hybrid network controller to send the appropriate set of messages to ΨRt in order to sync the ΨRt knowledge and databases with the current state of the network.

As also seen in FIG. 6, ΨCn has direct ΨRt-external interfaces to the application and physical layers. The following is a list of the information that is passed from the application and physical layers over these interfaces to ΨCn and vice versa. ΨCn will be activated typically at system bootup.

1 Message to the node(s) containing ΨCn notifying them of the ΨRt functional component configuration of a given target node or set of nodes in the network. Functional component configuration refers to which functions from the set (ΨRp, ΨRf, ΨRm, ΨTd, ΨRd) that the target node or set of nodes are configured with. This interface message would in general utilize whatever services publishing/discovery method resides on the network.

2 Message or signal to ΨCn to wakeup (activate) the other components of ΨRt

3 Message or signal to ΨCn to shutdown (deactivate) the other components of ΨRt

4 Message to ΨCn to monitor a timer (physical layer info) for when to activate/deactivate other ΨRt components 5 Message from application layer containing tactics for scheduling ΨRp, ΨRf, and ΨRm to run (These components first have to be activated.)

6 Get timer value

7 Set timer value

In the following discussion, "inputs" refers to information passed to ΨCn from one of the other components of ΨRt, and "outputs" refers to information passed from ΨCn to one of the other components of ΨRt. For specific communicated information (request, status response, etc) that is common between ΨCn and all the other major functional components of ΨRt, a single message is defined for each common communication item. The currently defined messages are included below. All other interfaces between ΨCn and the other ΨRt components is presented further below. Although the words "array", "list", "component" and other types of nouns are used in this document to refer to items, no implementation-specific construction is assumed. Therefore, it is of no intention in this document to specify whether a software designer implements an "array" as a formally-defined array, linked list, binary tree or any other computer science construct. That decision is left to the implementers of the concepts and entities identified in this document.

The Activate ΨRt Components ($T_n$, RequestorID, Ack, Component List) message includes $T_n$ as the network ID (IP address, ATM address, etc.) of the target node containing the components to be activated. RequestorID is the ID (IP address, ATM address, etc) of the requesting node containing the ΨCn function which is making this activation request. Ack, if set to TRUE, requests an explicit acknowledgement from the target node of the success of the component activation per requested component. If set to FALSE, no such acknowledgement is to be sent by the target node. Component List is the list of components to be activated on the target node.

The ΨRt Components Activated ($T_n$, Component List) message refers to the currently activated ΨRt components on the target node. This message may be sent to any authorized node in the network. $T_n$ is the network ID (IP address, ATM address, etc.) of the target node containing the activated ΨRt components. Component List is the list of components currently activated on the target node. The Deactivate ΨRt Components ($T_n$, RequestorID, Ack, Component List) message includes $T_n$ as the network ID (IP address, ATM address, etc.) of the target node containing the components to be deactivated. RequestorID is the ID (IP address, ATM address, etc) of the requesting node containing the ΨCn function which is making this deactivation request. Ack, if set to TRUE, requests an explicit acknowledgement from the target node of the success of the component deactivation per requested component. If set to FALSE, no such acknowledgement is to be sent by the target node. Component List is the list of components to be deactivated on the target node.

The ΨRt Components Deactivated ($T_n$, Component List) message refers to the currently deactivated ΨRt components on the target node. This message may be sent to any node authorized node in the network. $T_n$ is the network ID (IP address, ATM address, etc.) of the target node containing the activated ΨRt components. Component List is the list of components currently activated on the target node. The node making the deactivation request is assumed to also have knowledge of which ΨRt components were activated on the target node. Therefore, this node or some other having the same knowledge of such activation could check to see if all ΨRt components on the target node have been properly deactivated.

For ΨCn Interface to ΨRp, the Predict Routes ($T_n$, RequestorID, SDS Set) message includes $T_n$ as the network ID (IP address, ATM address, etc.) of the target node supervising the actual prediction. RequestorID is the ID (IP address, ATM address, etc) of the requesting node containing the ΨCn function which is making this prediction request. SDS Set is the set of Source Destination Subsets (SDS) for which this request for the prediction of routes is specified.

For ΨCn Interface to ΨRf, Route Failure Predicted ($P_n$, Component List) message includes $P_n$ is the network ID (IP address, ATM address, etc.) of the node predicting one or more route failures. Unless $P_n$ has standing instructions from ΨCn to automatically request ΨRm to predict a maintenance solution for the predicted route failure(s), $P_n$ must get instructions from ΨCn in order to determine what to do about the predicted route failure(s). The intent here is to keep ΨCn in control of this situation since ΨCn has a larger view of the network including the demands of applications under such circumstances.

The Auto Repair Predicted Route Failure AltRt ($P_n$,) message includes $P_n$ as the network ID (IP address, ATM address, etc.) of a node tasked with monitoring network node and link conditions affecting both predicted and non-predicted routes, predicting route failures, then utilizing ΨRm to predict the appropriate route maintenance solution, and then to save this solution in the appropriate location. If the solution is the prediction to use an alternative route (including even simple modifications to the failing route), then the predicted alternate route(s) are added to the appropriate route tables or cache, but not activated until actually needed. If the solution is not via the discovery and usage of alternative routes, including simple modifications of an existing one, then $P_n$ will not automatically repair the route(s) using ΨRm. In these cases, ΨCn will take direct control of the route repair authorizations on a case-by-case basis and direct such types of repairs to whichever nodes have the resources to handle these repairs. For example, it may be that the appropriate maintenance tactic is to boost the transmission power or increase the sensitivity of the receiving nodes at just the right time. Control of this type of adjustment of may not be desirable to automatically give directly to a slave process such as ΨRm. Therefore, in such a case, ΨCn would not allow $P_n$ to automatically perform this type of route maintenance and would instead direct the nodes directly attached to the links which are predicted to fail at some point in the future, to either/or boost the transmission power between them or increase their receiver sensitivities. All this must be done at the appropriate future time or else undesirable side effects like using up limited battery power or interfering with surrounding communications too soon might happen.

For ΨCn Interface to ΨTd, The Execute Global Topology Update ($T_n$, RequestorID, Period, Ack) message includes $T_n$ as the network ID (IP address, ATM address, etc.) of the target node instructed to perform this topology update. RequestorID is the ID (IP address, ATM address, etc) of the requesting node containing the ΨCn function which is making this global topology request. Period is an integer number of network system basic clock cycles at which $T_n$ is to perform a global topology update. If Period is set to 0, the global topology update by $T_n$ is only performed once and not subsequently reexecuted by $T_n$ unless $T_n$ receives another explicit message to do so. Ack, if set to TRUE, requests an explicit acknowledgement from the target node of the success of the global topology update each time such update is performed whether as a single event or as a periodically scheduled event. If set to FALSE, no such acknowledgement is to be sent by the target node.

The Global Topology Update Completed ($T_n$) message refers to the currently deactivated ΨRt components on the target node. This message may be sent to any node authorized node in the network. $T_n$ is the network ID (IP address, ATM address, etc.) of the target node containing the activated ΨRt components. The Cease Global Topology Updates ($T_n$, RequestorID, Ack) message includes $T_n$ as the network ID (IP address, ATM address, etc.) of the target node instructed to cease executing the global topology updates. RequestorID is the ID (IP address, ATM address, etc) of the requesting node containing the ΨCn function which is making this global topology request. Ack, if set to TRUE, requests an explicit acknowledgement from the target node of that is has ceased the global topology updates. If set to FALSE, no such acknowledgement is to be sent by the target node.

The Execute Topology Microbursts ($T_n$, RequestorID, NumBursts, Period, Ack, RSSP_List) message includes $T_n$ as the network ID (IP address, ATM address, etc.) of the target node instructed to perform this topology microburst. RequestorID is the ID (IP address, ATM address, etc) of the requesting node containing the ΨCn function which is making this topology microburst request. NumBursts is the number of samples of the topology from the same limited area of the network. Period is an integer number of network system basic clock cycles at which $T_n$ is to perform this topology update. If NumBursts is set to 1, Period is ignored. Ack, if set to TRUE, requests an explicit acknowledgement from the target node of the success of the microburst topology update each time such update is performed whether as a single event or as a periodically scheduled event. If set to FALSE, no such acknowledgement is to be sent by the target node. RSSP_List is the set of RSSPs covering the entire portion (could be the entire network) of the network for which the topology update was requested.

The Topology Microburst Request Status ($T_n$, Status) message includes $T_n$ as the network ID (IP address, ATM address, etc.) of the target node containing the activated ΨRt components. Status is set to 1 when the request is completed. Status is set to 0 if it is on-going. Status is set to −1 if this request has failed. No such interim or final status is reported to $T_n$ unless Ack is set to TRUE in the "Execute Topology Microbursts" message.

For the ΨCn algorithm, the following steps may be used:
1 External factors signal ΨCn to wake up the other components of ΨRt,
  These external factors could include the mechanism used to switch from one routing method to another routing method in a hybrid network;
2 ΨCn signals ΨTd, ΨRp, ΨRd, ΨRf and ΨRm to wake up from their inactive state;
3 ΨCn initially schedules ΨRp, ΨRf, ΨTd (global updates only) and ΨRm to run according to tactics specified by the application layer,
  Examples of the scheduling of these components can be periodic, aperiodic according to a mission plan, or according to a variety of network conditions such as degrading QoS, rapid changes in node density in parts of the network, etc.;
4 ΨRp, ΨRf, ΨTd (global updates only), and ΨRm continue to execute according to the above chosen scheduling plan;
5 ΨCn may receive and subsequently process requests from ΨRp to instruct ΨTd to perform limited area topology updates at some frequency (topology microbursts);
6 ΨCn may receive and subsequently process requests from ΨRp or an application to change the global topology update rate;
7 ΨCn continues to oversee the flow of ΨRt until being directed by an external signal to suspend or completely deactivate ΨRp, ΨRd, ΨRf, ΨRm and ΨTd;
8 If ΨRt has not been actually shut down, then go to step 1, otherwise Stop.

Data, such as mission and historical node movement data, are used to to forecast the need for communications between two nodes at some point in the future. ΨRp will attempt to satisfy this need by predicting from a variety of information what the network will topologically look like at the time the route is actually needed, determining the likelihood that a complete route can be predicted for the appointed future time, and identifying parts of the full route (route segments) that could be reliably predicted in the event it is deemed too hard to predict the full route.

The prediction engine described in this section is also used as the fundamental prediction engine for ΨRf, but with different logic wrapped around the engine for ΨRf since the goals of these two components of ΨRt are different. The predictor makes both local and global predictions. Local predictions will seek to use applications information such as mission plans, to predict the need for new routes. Other types of local predictions can include node and link stabilities. Stability type predictions are propagated to other nodes via topology updates and/or node beacons along with other link/node metrics. For example, these metrics could be returned in route replies for "conventional" MANET reactive routing schemes such as Ad Hoc On-Demand Distance Vector (AODV) or Dynamic Source Routing (DSR). These stability predictions are then used to adaptively control the required frequency of topology updates.

Global predictions have a number of traits. The predicted stability of various routing paths to a $D_n$ can be obtained from aggregating the link stabilities received via topology updates, beacon transmissions or from route replies. Acquisition of routing path stabilities from these mechanisms will allow regions of the network to be classified from low to high stability. Stable areas of the network can more likely support stable routes or partial routes than can less stable areas of the network. The terms "low" and "high" are considered to be "fuzzy" to endow global stability predictions with some robustness.

Quality of service (QoS) could also benefit from these global predictions. A QoS network component can use ΨRt's predictions to determine the likely frequency of route failure and the number of multiple routes needed to support a required class of service. Thus, when QoS classes of service are required for applications, the bond between the routing component and the QoS component becomes strong should the designer choose to use the predictive capabilities of ΨRt. Indeed, combining these two components in this way results in QoS-based routing schemes as opposed to applying QoS to routes discovered independent on QoS metrics.

Generally, route segments that are expected to be part of actual route future complete routes, are likely to be predicted more often than the future complete routes. The reasons for this are three-fold. First, in a highly dynamic network such as is the general case of a MANET, frequent topological changes mean that there will be more opportunity for a predicted full route from $S_n$ to $D_n$ to break up, than for selected, relatively stable parts of the route called route segments. As discussed above, these route segments would be specified by ($pS_n$, $pD_n$) pairs except at the boundaries of the associated routes. In other words, conceptually the highest probability of ensuring predictions being stable over the period of time needed to establish and utilize the route is accomplished by predicting route segments instead of entire routes. The boundary node in each segment closest, in terms of the selected routing metric or measure, to the $S_n$ is designated as the $pS_n$. The terminating boundary node in the route segment is $pD_n$. If $S_n$ or $D_n$ are part of a given predicted route segment then those nodes, and not their counterpart proxies, form the predicted route segment. This would result in route segments of the forms ($S_n$, $pD_n$) or ($pS_n$, $D_n$).

The node controlling the prediction process for the desired pair ($S_n$, $D_n$) preferably tracks and manages this segmented route prediction to ensure that by the time the entire route is needed to be activated for use, an entire route has been discovered and set aside for this purpose. This route segment prediction tracking and management function is an important part of the ΨCn component that initiated the prediction request.

Second, time constraints may limit the future route discovery window. Tactically valuable route segments could be prediscovered and preloaded into selected nodes' route tables/caches thereby shortening the future full route discovery process. There may also not be enough time available to discover complete future-needed routes, but there could still be enough time to discover segments of these routes. The settling time of the network for the discovery of any particular route is a major factor here.

Third, network bandwidth may become a significant limitation in the current time slots in which such route prediction should also take place. Therefore, the route discovery process would be a candidate for shortening since that adds to the overhead traffic in the network. The challenge here is to minimize the route discovery overhead during certain periods of time by finding only the "right" number of route segments during these bandwidth-restricted slots vs. trying to find the full route which would require more total network bandwidth during peak times.

These discussions imply that the application tactic of choice for route prediction is to be selective in the route segments chosen to be used for prediction. As will be discussed below, ΨRf and ΨRm can identify and repair many of these routes before such problems arise or at least shorten the response time to failures. However, frequent route and route segment maintenance activities tend to significantly diminish the throughput of the network even to the point of being critical at times. Therefore, the best general strategy is to reduce the need for route repairs by limiting the number of nodes in the predicted route segment based on the expected stabilities.

ΨRp tracks the topological changes in the network using both global and localized network topology updates some of which are similar to that of current routing methods such as Optimal Link State Routing (OLSR). A separate discussion on ΨTd is found below.

Not all nodes need to be ΨRp enabled nor, due to potential physical (power, processor type, memory capacity, communications capabilities) or information access limitations, can all nodes necessarily be so enabled. This is one of the justifications that leads to possibly restricting the number of nodes in a ΨRt network with the ΨRp ability. These "advantaged" nodes, called $\Psi_c$ (prediction control nodes), would then be able to make requests to other nodes or itself to get (retrieving from a route table/cache or discovering from scratch) routes or route segments that are predicted to be needed at some point in the future. If a route or route segment exists in the node that this request is sent to, then such a request would also have the effect of telling that node to not let that route expire until some amount of time after the route is to be actually needed.

There are a number of basic requirements that should be met for this predictor to be effective in a general MANET environment. There is no particular ordering the following list.

1 A predictor must be on-time implementable.
  A real-time implementation that keeps up with every microchange in the network is not in general necessary. On-time becomes real-time in the few cases in which these microchanges are critical.
  Improved hardware and bandwidth may help in specific applications, but not in the broadest sense of applicability.
2 A broadly applicable predictor must not require the collection of a lot of data (<100 data points) before being able to make a reliable prediction.
  This is more than just a real-time consideration. Collecting a lot of data would often not even be possible because all meaningful collection could frequently occur only over a few data points.
  The collection of a large quantity of such data simultaneously by many nodes in the network could result in too much overhead and threaten the available data bandwidth and timely response of the network.
3 A predictor must be robust in that it can issue reliable predictions even when relevant network conditions are "somewhat" outside the norm that the designer expects.
4 Predictors need not necessarily be complex, but the behavior of a predictor itself must stay within the bounds of acceptable predictability of the applications they serve.
5 The technology foundation of this strategic, fundamental predictor must be robust enough to function well regardless of the priority ordering of the above requirements in this list.
  This priority ordering could vary from application to application.

Candidates for the predictors for problems of a dynamically-changing MANET could be based on fuzzy logic, descision trees, rule induction or combinations of these. Nonparametric statistical or deterministic analysis is used to preprocess the data before sending to the actual predictor.

Based on the requirements outlined in section above, the ΨRp predictor method uses a fuzzy rule-based approach (not rule induction). The ΨRp example in this document uses deterministic node deployment information from the application layer, statistically-derived numerical data forecasting actual movement of nodes over time, and link stability information. In a general application of ΨRp, multiple types of data would be used and not necessarily of the types used in the example in this document, although these three types of data are in general very useful for route prediction.

ΨRp is composed of nine components. These components are:
1 Database (ΨDb)
2 Sampling and Database Update and Tactics (SDUT)
3 Knowledge Base (ΨKb)
4 Sampling and Knowledge Base Update and Tactics (SKUT)
5 Statistical Numerical Forecasts (SNF)
6 Information Structure Interface (ISI)
7 Fuzzifier (ΨFz)
8 Reasoning Engine (ΨRe)
9 Defuzzifier (ΨDf)

Each of these components is described below with the algorithm for using these components for the predictive functions of ΨRt discussed further below.

The database includes data-sets which are collected during the actual operation of the network and data which is preconfigured into the database. The database typically contains information that is typically descriptive of physical or operational characteristics of the network. Preconfigured data may be constants or default values for physical characteristics of nodes. The data may be either numerical or textual in form. Much of the information in the database is retrieved from and relevant to the physical and application layers. The following is a list of information that should be acquired when possible and placed into this database to facilitate more accurate and useful predictions.
  1 Initial number of nodes in the network;
  2 Maximum number of nodes allowed in the network (irregularly, if ever sampled);
  3 Location of each node (frequently sampled);
  4 Maximum possible or permitted speed of each node
  5 ID of each node—often an IPv4/v6 or ATM address (sampled);
  6 Allowed power capacity of each node for communications
  7 Node communications power utilization rate;
  8 Current remaining power capacity for communications (sampled);
  9 Expected locations of nodes at planned times;
  10 Probability associated with each of the expected locations of nodes at the planned times;

11 Predetermined pairs or groups of nodes that are planned to be in communication with each other at various times;
12 Predefined movement patterns of nodes;
13 Planned removal of nodes from service;
14 Planned activation of nodes into service;
15 Predetermined required source routing paths;
16 Permitted location boundary of a node's movement;
17 Node movement rate—speed and acceleration (frequently sampled);
18 Node transmit distance;
19 Node receive distance;
20 Antenna type (omnidirectional, directional, unidirectional);
21 Current pointing direction (if directional) of antenna;
22 Planned future antenna pointing directions;
23 Link quality (stability, reliability, availability, etc).

These parameters, e.g. power-related information, are generic to $\Psi$Rt but are derived by custom interfaces (see FIG. 6—IF) which process very layer-specific information and output parameters needed by $\Psi$Rp and some other components of $\Psi$Rt. This is the tactic used to ensure $\Psi$Rt and all its components are transportable to any type of network composed of any type of hardware, MACs, mission plans, etc. Specifically, $\Psi$Rp will convert some of these to fuzzy values (fuzzify) before further usage.

Since $\Psi$Rp is prediction for the purpose of routing, the sampling strategy must support the database update requirements for the types of information collected and the validity of the information. Typical types of information are the items identified as "sampled" in the list of database information types above. The need for many nodes to hold large databases and sample information across the network can consume a significant percentage of the needed total network bandwidth, occupy too much of a node's memory and drain a node's power reserve. Therefore, "right-sizing" the database is critical as are the tactics for the efficient and timely synchronization of databases across multiple nodes.

Node position data is acquired by two types of sampling mechanisms with each mechanism sampling at two different timescales or frequencies (low frequency, low resolution position and high frequency, high resolution position). The first sampling mechanism uses a route discovery technique to acquire relative node positions at link-level resolution. The second sampling mechanism uses coordinate position data transmitted directly by either the node that the position data applies to or by another node that is designated to transmit its position data for other nodes in the network.

$\Psi$Rp issues a request for $\Psi$Td to perform "low frequency" global topology updates at the current low frequency rate. Detailed discussion of the actual Psiactive topology discovery process is presented below. $\Psi$Rp uses low frequency-acquired position data to isolate subsets of the nodes from which route and route segments are to be predicted. This overall low frequency assessment rate is application dependent and is initialized with a predefined rate provided by the designer. After initialization, this rate is adjusted as necessary as a result of $\Psi$Rp assessing the overall success of providing reliable, ontime routing for the application.

$\Psi$Rp issues a request for $\Psi$Td to perform "high frequency" global topology updates at the current high frequency rate. $\Psi$Rp uses high frequency-acquired position data for specified subsets of the network to calculate estimated node velocity (speed and direction) of all the nodes in the subset. This high frequency rate is application dependent and is initialized with a predefined rate provided by the designer. After initialization, this rate is adjusted as necessary as a result of $\Psi$Rp assessing the overall success of providing reliable, ontime routing for the application. The acquisition and decreases as the data acquisition frequency decreases.

Each node can independently collect data and store it in its local database. Generally, each node node's database is not only different from other nodes' databases in the numerical values of data items, but also in the types of data items collected. Since $\Psi$Rp that is being hosted on one node will in general need to obtain information contained in the databases of other nodes on some scheduled basis in order to make intelligent, informed predictions, it is essential that the databases be synchronized with each other as necessary to ensure the integrity of the data. This means that some of the needed database may be distributed among many others save on local node memory resources, while other information must be duplicated across selected subsets of nodes. The updating of this duplicated data is generally done at some rate independent of any particular access by nodes in order to maintain real-time prediction throughput.

The $\Psi$Rp knowledge base consists of the following general categories of knowledge-encoded information: General system fuzzy If-Then rules; Applications specific fuzzy If-Then rules; Sampling strategy used to populate the database; and Tactics used to synchronize databases across multiple nodes.

The Statistical Numerical Forecasts part of $\Psi$Rp uses the Holt-Winters extension to the classic exponentially weighted moving average (EWMA) univariate forecasting procedure to produce the numerical forecasts (preditions) calculated at various timscales. Techniques such as Holt-Winters and EWMA are "ad hoc" techniques because no proper statistical model is associated with these types of techniques. Nevertheless, such forecasting methods have proven to be very useful and practical in practice. The results from each timescale serves as a separate numerical input into the overall $\Psi$Rp prediction. For simplicity, only two timescales are utilized resulting in statistical numerical forecasts that serve as two of the three major inputs into a fuzzification mapping. If sufficient computational power is available at the prediction nodes along with sufficient real-time or ontime data inputs to "blackout" period. It will be the responsibility of the (multiple timescale granularities) could be increased to improve prediction results as may be required by the application.

One input is a large time interval forecast (LTIF) and the second is a short time interval forecast (STIF). The third input into the fuzzifier is not necessarily directly based on $\Psi$Rp numerically-calculated forecasts and will be discused later as input directly from the knowledge base. LTIF is the forecast based entirely on data, such as node movement and link stability, acquired long before the actual route has to be used. STIF is the forecast based entirely on the same data used for the LTIF except that the STIF applies only to this data acquired just before the actual route is to be utilized. The final numerical forecast is a weighted combination of STIF and LTIF.

In general, these weights are depend upon time with LTIF more heavily weighted than the STIF right after the requested route is predicted, but with less weight than the STIF near the time for actual first usage of the predicted route. These weights may be set one of three basic ways: 1) nonparametric statistical estimation, 2) parametric statistical estimation, 3) fixed deterministic values.

The following is the set of equations used for the Holt-Winters forecasts for any timescale.

$$\hat{Y}_{t+P|t} = M_t + B_t P + C_{t+P|t} P = 1, 2,\quad (1)$$

$$M_t = \lambda_0 Y_t + (1-\lambda_0)(M_{t-1} + B_{t-1})\quad (2)$$

$$B_t = \lambda_1(M_t - M_{-1}) + (1-\lambda_1)B_{t-1}\quad (3)$$

$$C_t = \lambda_P(Y_t - M_t) + (1-\lambda_P)C_{t-P} \quad 0 < \lambda_0, \lambda_1, \lambda_P \leq 1\quad (4)$$

$\hat{Y}_{t+P|t}$ is the prediction of future observations P time period from the current time t period given the value of $M_t$, which is the prediction for the current value of Y at time t or $Y_t$. $B_t$ is the slope of the prediction equation which is interpreted to mean the local linear trend of the data series. $C_t$ is the "seasonal" component that in this case is considered to be additive in nature. Some seasonal components may be multiplicative in nature and therefore equation (1) would change to reflect this multiplicative nature. For discussion, the additive case is assumed. $\lambda_0$, $\lambda_1$, $\lambda_P$ are smoothing constants in the range specified above. These recursive equations permit the reuse of results from one time period earlier to calculate the current time period results for each of the above equations.

The mathematical difference between LTIF and STIF is the length of each time interval. The practical difference is the ability to "home" in on the optimal prediction given the data and knowledge base inputs without overloading the computational and network bandwidth of the prediction nodes and the network. Sampling and processing at different timescales is Ack, Component List) message includes $T_n$ as the network ID granular timescale level as such a tactic would significantly increase amount of data to acquire and process. Another benefit of the multiple timescales is to rapidly acquire and discern features of the behavior of the network (nodes and links) which exhibit themselves most readily at some natural timescale or frequency. There is no requirement for the LTIF time interval to be an integer multiple of the STIF time interval. Optimally, the length of each interval should be set according to the demands of the application, although a generic STIF and LTIF can also be defined.

Fundamentally, ΨRP does not restrict the acquisition and analysis of data to the time domain. ΨRp may also be formulated in the frequency domain, but that means changing from the Holt-Winters set of equations to an equivalent set in the frequency domain. This is not discussed in this document since the time domain captures the essence of any formulation of ΨRp needed to present the concepts and functions of ΨRp.

The Information Structure Interface (ISI) is the combined interface between the external and internal components of the network and ΨRp. The external interfaces are discussed below. The internal interfaces are those interfaces interconnecting two or more of the 8 other major components of ΨRp to each other. ISI is mainly concerned with the presentation form of the data and knowledge that is being communicated to and within ΨRp. More optimum presentation of this data and knowledge means more efficient and easier-to-understand information transport and processing within ΨRp. One notable ISI component is the interface that extracts information in IPv4/6 protocols and converts it to forms recognized by various ΨRp components. The companion for this particular ISI component builds IPv4/6 packets from ΨRp information that must be transported over the Internet. Other such interfaces could exist for other types of transport protocols such as ATM and Frame Relay.

The ΨRp fuzzifier takes numerical information from the SNF and the knowledge base and maps them into a "fuzzy" space described by fuzzy sets. In a real world dynamic network, especially a MANET, the prediction problem will usually have some nonstatistically-quantifiable vagueness either in the target prediction itself or in the intermediate forecasts needed to arrive at the target prediction. For instance, mission plans may specify that at some given future time, it will be necessary to establish a route between a certain ($S_n$, $D_n$) pair. The difficulty becomes how to specify the position and connectivity of nodes which would be candidates as the intermediate nodes in this route at the specified future time given a complex, many-body interaction problem. In other words, this problem has a very specific goal but to get there, must utilize vaguely-knowable future node, link and system state information.

Approaches such as statistical processing, including ad hoc methods like Holt-Winters, and conventional rule-based systems produce results which are too "brittle" to handle such problems. Brittleness is the opposite of robustness and therefore violates the rule discussed above which requires any predictor to be robust in its ability to handle vague specification of target routes. The present invention proposes to formulate this problem in fuzzy space with the appropriate fuzzy logic operators which together handle this type of vagueness and overcome the brittleness of more conventional approaches.

The fuzzy space mapping and fuzzy logic operations are used for the computation of information and for the formulation/evaluation of production rules. The net effect is to enable ΨRp to be more robust in its predictions than possible otherwise. Mathematically rigorous fuzzy logic is applied to combine inputs and produce the appropriate mapping. Another advantage of fuzzy logic is that it requires minimal computational and memory resources and can be readily backtracked to understand how the results were obtained.

The functions of Reasoning Engine (ΨRe) are to evaluate the production rules and to fuse multiple rules' outputs into a single fuzzy set. These rules may fire as a result of the inputs from each timescale and the ΨKb. ΨRe's basic problem is inherently fuzzy in nature, unlike conventional reasoning engines and the output from a fuzzy reasoning engine will typically be far less brittle than that produced by its conventional counterpart.

The Defuzzifier ΨDf is responsible for mapping the output of ΨRe into a numerical value, range or set of values which is then the proper forecast (prediction) to be used by ΨRt. Although not part of ΨRp per se, ΨRt may choose to collect multiple such forecasts and compare these forecasts against actual outcomes to determine higher level system evolutionary characteristics or trends and use these as feedback into the prediction process via ΨKb. These additional processing approaches are not discussed here.

As seen in FIG. 6, there are direct interfaces of ΨRp with the applications, datalink and physical layers. Within ΨRt, ΨRp directly interfaces to ΨCn, ΨRd and ΨTd. Each of these interfaces is discussed below. The following is a list of the information that ΨRp uses that is derived from the applications, datalink and physical layers: Expected locations of nodes at planned times; Probability associated with each of the expected locations of nodes at the planned times; Predetermined pairs or groups of nodes that will be in communication with each other at planned times; Predefined movement patterns of nodes; Planned removal of nodes from service; Planned activation of nodes into service; Predetermined required source routing paths; Permitted location boundary of a node's movement; Node movement rate; Node transmit and receive distances; Remaining life of node power source; Antenna type (omnidirectional, directional, unidirectional); Current pointing direction (if directional) of antenna; Planned future antenna pointing directions; and Link quality (stability, reliability, availability, etc).

The following is the information that ΨRp inputs and outputs from/to ΨRd. The Route Discovery Status ($T_n$, RequestorID, Status, Term_Node ID) message includes $T_n$ as the network ID (IP address, ATM address, etc.) of the target node instructed to perform the route discovery. RequestorID is the ID (IP address, ATM address, etc) of the requesting node containing the ΨRp function which is making this route discovery request. Status is set to TRUE if full requested route was discovered. Status is set to FALSE if request was not successful. If Status is FALSE, then Term_Node ID is either set to −1 or is set to some other node ID of the same form as RequestorID. If set to −1, not even a stable route segment of the requested route could be discovered. If Status is FALSE and Term_Node ID≠−1, then the discovery process was only able to find a route segment of the actual requested route or proxy route. Nevertheless, even a route segment of a proxy route is better than not being able to discover any part of the actual needed route.

The Find_Route_Request ($S_n$, $D_n$, ReqID, RequestorID, ExpTime) message includes $S_n$ as either the true target source node that the node generating this request to ΨRd needs to establish according to its ΨRp prediction or else is a "proxy source" node ($pS_n$). Also, $D_n$ is either the true target destination node that the node generating this reques to ΨRd needs to establish according to its ΨRp prediction or else is a "proxy destination" node ($pD_n$). ReqID is this particular active route request originating from this node. RequestorID is the ID (IP address, ATM address, etc). ExpTime is the amount of time that the node receiving this request as well as the target $S_n$,has to wait after finding the route or route segment before marking it as stale and subsequently deleting it.

The following describes the "normal" algorithm for route predition using the Psiactive concepts and architecture described in this document. Other algorithms are possible that utilize the Psiactive architecture and concepts.

1 Initialize the node and network databases with appropriate physical characteristics of nodes and links.
2 Initialize the node and network knowledge bases with the appropriate fuzzy rules.
3 Perform topology discovery to locate and track the position of nodes whose future positions are specified for in mission plans. This is one step in the process of predicting future-needed routes which is not the same as predicting future needed routes to circumvent a predicted route failure which are discussed below.
4 Perform topology discovery to locate and track the position of ($S_n$, $D_n$) pairs designated in mission plans as communication pairs whose future positions are not explicitly planned or known apriori.
5 Predict the link quality utilizing predefined plans as input data as well as link quality data collected during network operation. This step is for the purpose of predicting good routes in the route discovery process.
6 Predict node quality utilizing predefined plans as input data as well as node quality data collected during operation.
7 Predict the position of nodes that satisfy qualifying criteria as intermediate nodes for the planned ($S_n$, $D_n$) pairs.
8 Perform topology discovery to locate and track the position of single nodes of interest whose future positions are predicted on the basis of input from real-time topology discovery and tracking and not from mission plans.
9 Perform topology discovery to locate and track the position of ($S_n$, $D_n$) pairs designated by real-time requests as communication pairs.
10 Predict node quality utilizing predefined plans as input data as well as node quality data collected during operation.
11 Predict the position of nodes that satisfy qualifying criteria as intermediate nodes for ad hoc requests ($S_n$, $D_n$) pairs.
12 A route prediction requester node ($P_r$) sends a message to a target prediction control node ($P_c$) to determine a future-needed route from a designated source node ($S_n$) to a designated destination node ($D_n$).
13 $P_c$ takes control of the prediction request until completed.
14 $S_n$ first checks its local routing table (cache) to determine complete routes or route segments that are already marked as stable over the length of time delay before the route is needed.
15 $P_c$ retrieves valid global topology information to determine the area of interest (AOI) of the network on which to focus the prediction for the requested ($S_n$, $D_n$) pair. If several ($S_n$, $D_n$) pairs are collected into a "batch", then the global topology update can cover all of these in a single global topology update request. If a global topology update is underway during this request, the global topology update is completed before $P_c$'s request is honored.
16 $P_c$ then requests ΨTd to perform a "topology microburst" within the designated AOI.
17 A Holt-Winters exponentially weighted moving average linear trend is then computed by the $P_c$ using the data acquired from the topology microburst.
18 Use a modified version of the Holt-Winters forecast equations with "seasons" at multiple timescales.
19 Apriori determined values, for example node position from mission plans, may be substituted for some actual measurements. At least some of the data used in the modified Holt-Winters equations must be actual measured data while the network is in operation.
20 Numerical values are then mapped into "fuzzy predictions" via the Fuzzification stage.
21 The Reasoning Engine uses inputs from the knowledge base and the fuzzy predictions to evaluate the production rules and aggregate the fuzzy outputs resulting from all firing rules into one fuzzy set.
22 The Defuzzifier maps the fuzzy result into the modified numerical predicton.

Regarding Psiactive Route Discovery (ΨRd), Routes and parts of routes are added to the appropriate route tables (caches) as predictions dictate. When a node receives a request to send information to another node, that route has either completely or in part already been discovered and loaded into a route table (cache) of the source node $S_n$. Users will not only have the confidence that route failures can be repaired when they occur, but ΨRt will also be looking into how to fix predicted possible route failures before the failures actually occur and therefore the repair process should go much faster.

Link and node information are prime determining factors as to whether a complete route or a route segment can be reliably predicated for the time period needed. Such information includes stability, reliability and availability. Actual route discovery is usually accomplished by a reactive protocol applied to the route segments of the entire ($S_n$, $D_n$) route. The route discovery request generally originates from a some node not part of the segment although this "externalness" of the requesting node is not a requirement. This is a significant departure from other approaches in which the route discovery request always originates from the source node of the target ($S_n$, $D_n$) pair. The reasoning behind this departure is that the future $S_n$ for this future route is just that—a future source node. This means that the network node which will at some future time need to have this route established is not necessarily the node which currently is in position to know this need. Why, this future source node may not even currently exist in the network and therefore would not be in any position to even predict that it would some day need to have a route to some destination node $D_n$. One key advantage of a powerful route predictive capability is that nodes in the network not even a part of the future route could possess future knowledge of this need and start the route discovery process before one or both of the main focal points of this need, the ($S_n$, $D_n$) pair, are even in position to receive the route discovery request. This also is another prime reason to have proxy source and destination nodes.

Note that ΨRd is not dependent upon which conventional route discovery method (proactive or reactive) to use. Depending upon the particular problem, one method may be superior to another. ΨRd leaves this decision to the application or systems designer, although the defaults for ΨRd are Ad Hoc On-Demand Distance Vector (AODV) for the reactive method and Optimal Link State Routing (OLSR) for the proactive method. The discussions in this document only directly refer to these two route discovery methods.

$S_n$ accomplishes ΨRd by sending a message to a target "proxy $S_n$" ($pS_n$) to establish routes from $pS_n$ to a "proxy $D_n$" ($pD_n$). This phase of route discovery for the ($S_n$, $D_n$) pair starts at this pSn instead of at the actual $S_n$ and ends at the designated $pD_n$. The ($pS_n$, $pD_n$) route segment is recorded in nodes' local memories (route tables/cache). $pS_n$ and $pD_n$ are generally chosen as outcomes of the route prediction, route maintenance and topology discovery. Could also be chosen from information received from an application.

The Psiactive Route Failure Prediction (ΨRf) function estimates the likelihood of link failures (or dynamics) and uses this information to estimate the likelihood of route failure. A variety of sources of information can be used to estimate the likelihood of link failure including: node mobilities and trajectories, known obstructions in communication paths, and estimation and prediction of link quality. This link failure information can then be used to determine the aggregate likelihood of a route (which is just a series of links) failure. This information may be collected or distributed in either a proactive or reactive fashion depending on what routing techniques are selected in any given implementation. Depending on which approach or combination of approaches are taken, this link/route failure information may be distributed through the network either via topology updates or through a route discovery process. Route failure prediction information is then sent to the Psiactive Route Maintenance function.

ΨRf collects certain statistics for its node which are used in creating metrics. For example, some of these are: Estimated mean time to node shutdown or sleep mode (EMTNS); Estimated mean time to link failure for each link to a neighbor node (EMTNLF); and Estimated link quality (ELQ). Inputs to EMTNS, EMTNLF and ELQ calculations are, for example, estimated node mobility (ENM) and RF propagation characteristics. Certain metrics should be consistent with the Harris-identified QoS metrics defined for ad hoc networks. Each node sends out these metrics to other nodes.

These metrics are included in topology updates that are broadcast periodically or in response to topology update requests. They are also included in route discovery and route reply packets where each node along the path inserts the relevant metric information. This makes packet sizes larger, but the number of overhead transmissions fewer. These larger packets tend to make for potentially more bursty overhead traffic. Once the metrics for all nodes and links along a path are known at a source node, then two things can occur. First, we can calculate the Mean Time to Failure (MTTF) for the path from the source to the destination node. This applies to both ($S_n$, $D_n$) pairs and ($pS_n$, $pD_n$) pairs. Second, Psiactive Route Maintenance (ΨRm) will be informed of the MTTF for the path. ΨRm and ΨCn will determine what to do in response to this information.

Any route, R1, is composed of a series of links L1, L2, L3, . . . , Ln. Each of these individual links may be characterized by a rate of link failure, $\lambda Li$ (in failures/sec). There may be a variety of factors influencing the rate of link failure for example: the mobility of each node, the propagation environment, and any obstructions that might impair the link. The information that may be used to estimate the rate of link failure may be derived from several sources including link quality measurements and node movement trajectory information.

The ΨRf algorithm executes the following steps. 1—At every node and for each link to a neighbor node, estimate the rate of link failure $\lambda Li$ based upon one or more of the following observations: Known future node trajectories for neighbor nodes that allow link connectivity to be estimated (possibly from mission plans); Knowledge of current node location and extrapolation of node movement combined with knowledge of obstructions (such as foliage or buildings) along the estimated communication path; Continuous measurement of link quality and variations in quality and estimation of expected time to link dropout based on these statistical measures. 2—Create a link failure metric. This can be the rate of link failure $\lambda Li$, for each link from a node to each of its neighbor nodes. 3—Use the link failure metric in a creating routing failure metric. Assume for now that the link failure metric $\lambda Li$ is used. If the failures on each link may be modeled as a Poisson arrival process, then the failure of the route occurs if one or more link failures occur. Then the rate of route failure $\lambda Ri$ (in failures/sec), for route R1 assuming independence of links failures may be calculated as $$\lambda_{RI} = \sum_{i=1}^{n} \lambda_{Li}$$

Then the route failure metric will be $\lambda Ri$. The MTTF for route R1 is then $MTTF_{R1} = 1/\lambda_{R1}$ seconds.

Link failure metrics may be used in either proactive or reactive routing protocols. In a proactive protocol, the values of the link failure metrics will be included in any topology update packets that a node broadcasts either over a limited area of the network or over the entire network. In a reactive protocol, each node would use its local link failure metrics in updating route failure metrics for any routes evaluated in responding to route discovery packets.

Psiactive Route Maintenance (ΨRm) takes the route failure metrics produced by ΨRf as well as route performance metrics (such as delay and capacity) and determines how best to insure that routes are maintained that meet the system performance goals as well as route failure likelihood goals. The mean time to find a new route may be denoted as $1/\mu$ (in seconds). A rough order of magnitude for this variable is $\mu \approx 1$ or a small number of seconds for most interesting reactive and proactive routing protocols. Thus, we should find a new route (if one exists) in 1 second or so for reasonable link capacities. If we have a single route available, then we must have $MTTF_{R1} \gg 1/\mu$ in order for a route to be available most of the time when it is needed. If $MTTF_{R1}$ is too small, then maintaining multiple routes will allow a much larger overall MTTF to be obtained that insures that, almost all of the time, a route to the destination will be available.

There are two principal strategies that are part of ΨRm. A strategy for requesting the discovery of new and multiple routes, and a strategy for using multiple routes.

ΨRm does not necessarily require finding an alternative route. Other strategies are also possible and useful in the right circumstances. One such strategy could also mean boosting the capacity or resilience of the route to failure via for example, pre-boosting the transmission power on a link and preallocating additional channels on the link.

ΨRm is composed of both a predictive route maintenance component and a conventional route maintenance component. The predictive component is used when parts of routes are predicted to be likely to fail. We are given an MTTF for the path from ΨRf and also given the MTTF estimates for all nodes and links along the path. It is then determined if there are alternate paths in the routing table/cache that are likely to be stable for at least the early part of the timeframe needed. If a new route is needed, an alternate path will be required to be discovered within some fraction of the time estimated as the MTTF. ΨRp is then informed that an alternate path is to be discovered prior to time T1. The path, P1, is provided as well as sets of nodes and links that may be of questionable duration.

The conventional component is used when the probability of failure is 1, that is, when the failure has occurred. A conventional notification of the source of the failure via Route Error (RERR) packets can be used in this case. New route discovery will be initiated in response to this notification.

ΨRm takes the route failure metrics produced by ΨRf as well as route performance metrics (such as delay and capacity) and determines how best to insure that routes are maintained that meet the system performance goals as well as route failure likelihood goals. In selecting routes, this allows a tradeoff between performance metrics such as delay and capacity vs. route failure likelihood. One way to accomplish this is to set minimum acceptable values for delay and capacity and a maximum acceptable value for route failure likelihood.

There are several strategies that could be followed in predicting the need for new routes and replacing failed routes: One could find a batch of routes to a destination and then use these routes until all have failed before attempting to replace any of the routes; One could replace routes as they fail always attempting to maintain at least K routes, where K is the number of routes required to maintain the desired route reliability.

When new routes are needed, they are requested from ΨRd which determines new routes either by proactive or reactive means. Analysis of the route failure likelihood can be used to determine if new routes are needed to meet an objective goal for route failure likelihood. The following analysis indicates how this might be done depending on the strategy employed for using multiple routes. If one does not replace routes as they fail, then the analysis of the MTTF is straightforward. Assume that each route has the same route failure rate of $\lambda R$ (in failures/sec), and that route failures are independent. If no repair of routes is done, the failure process can be modeled as a Markov chain. Then with N routes the MTTF of all routes is $$MTTF_{\text{All\_Routes}} = \frac{1}{\lambda_R} \cdot \sum_{i=1}^{N} \frac{1}{i}$$

The mean time to have only K good routes remaining is $$MTT_{\text{K\_Routes}} = \frac{1}{\lambda_R} \cdot \sum_{i=K+1}^{K} \frac{1}{i}$$

We can also analyze the strategy of repairing routes as they fail. If we assume we start with N routes and repair routes as they fail, the problem can also be analyzed as a Markov chain. Then in steady-state, the probability of k route failures that have not been repaired is $$Pr(\text{k\_failures}) = \frac{(\lambda/\mu)^k \cdot \binom{N}{k}}{(1+\lambda/\mu)^N},$$

With larger values of N and/or values of $\lambda/\mu$, then the probability that all N routes have failed can be made very small. Calculations such as these can be a central element in an adaptive algorithm for determining how many routes should be maintained at any time and when new routes should be discovered.

There are also several possible strategies for using multiple routes. Each of the following approaches could be used within ΨRm:

1—Use only one route at a time for a given destination node (Other routes would be available as alternate routes in case the primary route failed. This would lead to potential temporary outages during the time needed for detection of the failed route).

2—All functional multiple routes to a destination can be used by splitting traffic to that destination over the multiple routes in a round robin or other fashion to balance the load among the multiple paths. This has the advantage of better load balancing in the network. In addition, if a route is lost, then traffic may continue to be delivered over the other paths so only a portion of the traffic will be lost during the time that the route failure is undetected. This would cause some degradation of QoS for real-time traffic and a need for retransmissions in TCP traffic.

3—Use multiple routes to a destination by routing the same traffic to that destination over each route redundantly for traffic flows that require a particularly high level of QoS. This approach has the disadvantage of using a significant amount of additional resources (capacity) to transmit the redundant information. However, this has the advantage that the loss of a route does not even temporarily lead to loss of data during the time that the route failure is undetected because redundant information is transmitted over the other routing paths. Once a loss of a route is detected, then an attempt can be made to discover an additional route to maintain the desired number of redundant routes.

4—Use multiple routes to a destination simultaneously by splitting the traffic to a destination among the multiple routes by using network-time coding. This approach uses parity checks of an error correction code with interleaving to utilize simultaneous routes for the same traffic to a destination in a very efficient fashion to provide a very high level of QoS. As in the previous approach, this approach has the advantage that the loss of a route does not even temporarily lead to loss of data during the time that the route failure is undetected because redundant information is transmitted over the other routing paths via the FEC parity checks.

Then using one of the strategies outlined above for usage of multiple routes, the following procedure is used to control ΨRm:

1—Update the value of $\lambda_R$ (in failures/sec) for each route that meets minimum route performance metrics to each destination as this information is received from ΨRf.

2—Calculate the value of $MTTF_{Routes}$ for routes to each destination node. The procedure used in this calculation will depend on the strategy employed for using multiple routes.

If the value of $MTTF_{Routes}$ is less than the minimum required value of $MTTF_{Routes}$, then one or more additional routes may be needed.

If additional routes are needed, ΨRd is triggered to attempt discover of additional routes to the destination.

Adapt utilization of routes to include new routes if more are found. Exactly how this is done will depend on which of the strategies for using multiple routes are used. For example, if network-time coding is used, then the code rate and interleaver parameters may be adjusted to accommodate the additional route. Then a portion of the traffic traffic (including parity) to that destination node may be sent over the new route(s).

ΨTd is the method used by ΨRt to determine the network topology (node and link configuration/status). ΨTd supports both predictive and non-predictive aspects of route discovery, route failure analysis and route maintenance. Psiactive topology discovery employs two primary activation tactics. First, activate only when a prediction is to be made. Second, activate "topology discovery microbursts" (TDmBs) to take closely-spaced topology snapshots over a relatively very short time period of the same set of nodes. This helps determine localized node movement characteristics should other information not be available to supply this movement information at the resolution needed.

ΨRt uses information from occasional wide area network topology updates when predictive route discovery is needed. This wide area topology information serves as a global map from which more limited subsets of nodes can be extracted on which to perform very focused topology updates (discovery). Restricting the topology discovery for a subset of nodes is performed by the following process. Source node Sn sends a message "Report Local Topology" with the following parameters: Ids of each node in the target subset of nodes 1 Neighbor discovery around each target node of N hops;
2 Time-to-Live for discovery packets;
3 Number of topology reports to send out;
4 Sampling period within each topology report.

The result of topology discovery can be used to limit the route discovery packet propagation. This result can specify the subset of nodes that the route discovery and therefore the route must go through. The default topology discovery for Ψ-Routing is a link state topology discovery technique limited to only the (areas) specified by the source node Sn at topology discovery activation time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for operating a mobile ad hoc network comprising a plurality of mobile nodes and a plurality of wireless communication links connecting the mobile nodes together, the method comprising:
  predicting future-needed routes in the network, a route comprising a set of wireless communication links and mobile nodes from a source to a destination;
  predicting future-network dynamics including predicting future route failure and predicting future route maintenance;
  discovering at least partial routes along predicted future-needed routes in the network based upon the predicted future-network dynamics; and
  storing the at least partial routes;
  wherein predicting route failure includes generating route failure metrics including at least one of link failure metrics and node failure metrics for each route, and predicting future route maintenance includes discovering alternative routes.

2. A method according to claim 1 wherein predicting future-network dynamics includes monitoring current-network dynamics.

3. A method according to claim 1 wherein complete routes along predicted future-needed routes in the network are also stored.

4. A method according to claim 1 wherein discovering at least partial routes along predicted future-needed routes in the network comprises discovering routes from a proxy-source node to a proxy-destination node.

5. A method according to claim 4 wherein the proxy-source node and proxy-destination node are chosen based upon predicted future stability of links and nodes along predicted future-needed routes.

6. A method according to claim 4 wherein the source node transmits a request to the proxy-source node to establish a partial route from the proxy-source node to the proxy-destination node.

7. A method according to claim 1 further comprising predicting future stability of links and nodes along predicted future-needed routes including each node predicting and transmitting link and node stability information to other nodes.

8. A method according to claim 7 wherein the link and node stability information is transmitted to other nodes via replies to route requests.

9. A method according to claim 1 wherein future-needed routes are predicted based upon at least one of mission plans, schedules, planned traffic patterns and network management data.

10. A method for operating a mobile ad hoc network comprising a plurality of mobile nodes and a plurality of wireless communication links connecting the mobile nodes together, the method comprising:
predicting a need for future communications between at least two of the plurality of mobile nodes based upon current and historical traffic data;
predicting future-network topology including predicting future route failure and predicting future route maintenance;
discovering routes, including at least one of partial routes and complete routes, based upon the predicted need for future communications and the predicted future-network topology, a route comprising a set of wireless communication links and mobile nodes from a source node to a destination node; and
storing the discovered routes;
wherein predicting route failure includes generating route failure metrics including at least one of link failure metrics and node failure metrics for each route, and predicting future route maintenance includes discovering alternative routes.

11. A method according to claim 10 wherein predicting future-network dynamics includes monitoring current-network dynamics.

12. A method according to claim 10 wherein discovering partial routes comprises discovering routes from a proxy-source node to a proxy-destination node.

13. A method according to claim 12 wherein the proxy-source node and proxy-destination node are chosen based upon predicted future stability of links and nodes.

14. A method according to claim 12 wherein the source node transmits a request to the proxy-source node to establish a partial route from the proxy-source node to the proxy-destination node.

15. A method according to claim 10 further comprising predicting future stability of links and nodes including predicting and transmitting link and node stability information.

16. A method according to claim 15 wherein the link and node stability information is transmitted to other nodes via replies to route requests.

17. A method according to claim 10 wherein the need for future communications is predicted based upon at least one of mission plans, schedules, planned traffic patterns and network management data.

18. A mobile ad hoc network comprising:
a plurality of mobile nodes;
a plurality of wireless communication links connecting the mobile nodes together;
each mobile node comprising
a communications device to wirelessly communicate with other nodes of the plurality of nodes via the wireless communication links, and
a controller to route communications via the communications device, and comprising
a route-need predictor to predict a need for future communications between at least two of the plurality of mobile nodes,
a topology predictor to predict future-network topology including predicting future route failure and predicting future route maintenance,
route tables to define partial and complete routes in the network, a route comprising a set of wireless communication links and mobile nodes from a source node to a destination node, and
a route discovery module to discover routes, including at least one of partial and complete routes, based upon the need for future communications and the predicted future-network topology, and to update the route tables;
wherein predicting route failure includes generating route failure metrics including at least one of link failure metrics and node failure metrics for each route, and predicting future route maintenance includes discovering alternative routes.

19. The network according to claim 18 wherein the route discovery module discovers routes from a proxy-source node to a proxy-destination node.

20. The network according to claim 19 wherein the proxy-source node and proxy-destination node are chosen based upon predicted future-network topology.

21. The network according to claim 19 wherein the route discovery module transmits a request to the proxy-source node to establish a partial route from the proxy-source node to the proxy-destination node.

22. The network according to claim 18 wherein the topology predictor predicts and transmits link and node stability information to other nodes.

23. The network according to claim 22 wherein the link and node stability information is transmitted to other nodes via replies to route requests.

24. The network according to claim 18 wherein the route-need predictor predicts the need for future communications based upon at least one of mission plans, schedules, planned traffic patterns and network management data.

25. A wireless mobile node for use in a mobile ad hoc network comprising a plurality of mobile nodes, and a plurality of wireless communication links connecting the mobile nodes together, the wireless mobile node comprising:
a communications device to wirelessly communicate with other nodes of the plurality of nodes via the wireless communication links; and
a controller to route communications via the communications device, and comprising
a route-need predictor to predict a need for future communications to another node of the plurality of mobile nodes,
a topology predictor to predict future-network topology including predicting future route failure and predicting future route maintenance,
route tables to define partial and complete routes in the network, a route comprising a set of wireless communication links and mobile nodes to a destination node, and
a route discovery module to discover routes, including at least one of partial and complete routes, based upon the need for future communications and the predicted future-network topology, and to update the route tables;
wherein predicting route failure includes generating route failure metrics including at least one of link failure metrics and node failure metrics for each route, and predicting future route maintenance includes discovering alternative routes.

26. The wireless mobile node according to claim 25 wherein the route discovery module discovers routes from a proxy-source node to a proxy-destination node.

27. The wireless mobile node according to claim 26 wherein the proxy-source node and proxy-destination node are chosen based upon predicted future-network topology.

28. The wireless mobile node according to claim 26 wherein the route discovery module transmits a request to the proxy-source node to establish a partial route from the proxy-source node to the proxy-destination node.

29. The wireless mobile node according to claim 25 wherein the topology predictor predicts and transmits link and node stability information to other nodes.

30. The wireless mobile node according to claim 29 wherein the link and node stability information is transmitted to other nodes via replies to route requests.

31. The wireless mobile node according to claim 25 wherein the route-need predictor predicts the need for future communications based upon at least one of mission plans, schedules, planned traffic patterns and network management data.

* * * * *